United States Patent [19]

Fan et al.

[11] Patent Number: 4,529,782
[45] Date of Patent: Jul. 16, 1985

[54] HIGH MOLECULAR WEIGHT WATER SOLUBLE POLYMERS

[75] Inventors: You-Ling Fan, East Brunswick, N.J.; Nan S. Chu, Hartsdale, N.Y.; George L. Brode, Bridgewater, N.J.; Meyer R. Rosen, Spring Valley, N.Y.

[73] Assignee: Union Carbide Corporation, Danbury, Conn.

[21] Appl. No.: 552,735

[22] Filed: Nov. 17, 1983

Related U.S. Application Data

[63] Continuation of Ser. No. 302,110, Sep. 14, 1981, abandoned.

[51] Int. Cl.$^3$ .................. C08F 30/04; C08F 130/04; C08F 230/04
[52] U.S. Cl. .................. 526/240; 526/259; 526/307.7
[58] Field of Search .......................... 526/240

[56] References Cited

U.S. PATENT DOCUMENTS

| | | | |
|---|---|---|---|
| 2,980,609 | 4/1961 | House et al. | 210/734 |
| 3,284,393 | 11/1966 | Vanderhoff | 526/317 |
| 3,418,237 | 12/1968 | Booth et al. | 210/97 |
| 3,578,586 | 5/1971 | Gal et al. | 210/734 |
| 3,658,771 | 4/1972 | Volk et al. | 209/5 |
| 3,691,124 | 9/1972 | Barron | 524/801 |
| 3,850,898 | 11/1974 | Ide et al. | 210/734 |
| 3,872,063 | 3/1975 | Kim | 526/240 |
| 3,926,756 | 12/1975 | Restaino | 526/240 |
| 3,957,739 | 5/1976 | Cabestany et al. | 526/240 |
| 3,996,180 | 12/1976 | Kane | 524/801 |
| 3,997,492 | 12/1976 | Kane | 524/801 |
| 4,035,347 | 7/1977 | Korzenski et al. | 526/240 |
| 4,237,253 | 12/1980 | Jacquet et al. | 526/240 |
| 4,288,582 | 9/1981 | Lucas et al. | 526/240 |
| 4,330,450 | 5/1982 | Lipowski et al. | 210/734 |

FOREIGN PATENT DOCUMENTS

| | | | |
|---|---|---|---|
| 2543135 | 10/1976 | Fed. Rep. of Germany | 210/727 |
| 1137495 | 12/1968 | Hungary | 526/240 |
| 51-18913 | 6/1976 | Japan | |
| 870711 | 8/1959 | United Kingdom | |

OTHER PUBLICATIONS

Heller, W. and Pugh, T. L., *J. Chem. Soc.*, 24, 1107, (1956).
Heller, W. and Pugh, T. L., *J. Polymer Sci.*, 47, 203, (1960).
Smellie, Jr., R. H. and LaMer, V. K., *J. Coll. Sci.*, 13, 589, (1958).
Walles, W. E., "Role of Flocculant Molecular Weight in the Coagulation of Suspensions," *J. Coll. and Inft. Sci.*, 27, No. 4, Aug. 1968.
Furusawa, K., Tezuki, Y. and Watanabe, N., "Adsorbed Polymer Layers on the Platelet Particles and Their Effect on Colloidal Stability. I. Effect of Polymer Concentration and Molecular Weight," *J. Coll. and Intf. Sci.*, 73, No. 1, p. 21, Jan. 1980.
LeMer, V. K. and Healy, T. W., "Adsorption-Flocculation Reactions of Macromolecules at the Solid-Liquid Interface," *Reviews of Pure and Applied Chem.*, 13, pp. 112-133, (1963).
ACS article, "Fractionation of Linear Polyethylene with Gel Permeation Chromatography", pp. 99-107.
Derwent Japanese Patents Report, vol. 76, No. 25, Jun. 16, 1976, Section D, p. 2.
Caskey et al. article, "Effect or Polyacrylamide Molecular Structure on Flocculation Efficiency," 1974 AICHE Symposium on Water-1974-1, Industrial Wastewater Treatment, pp. 12 to 128, Gary F. Bennett, Director.

*Primary Examiner*—Joseph L. Schofer
*Assistant Examiner*—N. Sarofim
*Attorney, Agent, or Firm*—Henry H. Gibson

[57] ABSTRACT

Described herein are water soluble acrylamide containing polymers having an intrinsic viscosity of at least about 15 dl/g. These polymers are suitable for use in water purification.

7 Claims, No Drawings

HIGH MOLECULAR WEIGHT WATER SOLUBLE POLYMERS

This application is a continuation of prior U.S. application Ser. No. 302,110 filing date Sept. 14, 1981, now abandoned.

This invention is directed to water soluble acrylamide containing polymers having an intrinsic viscosity of at least about 15 dl/g. These polymers are suitable for use in water purification.

Water-soluble acrylamide polymers and copolymers are used for water purification. For example, U.S. Pat. Nos. 3,790,476 and 3,790,477 describe the use of such acrylamide polymers and copolymers for thickening or dewatering solids from sewage.

Japanese patent publication No. 18913/76 describes a method of accelerating the aggregation filtration of a fine mineral particle suspension. The publication describes that the use of water-soluble copolymers, terpolymers and higher polymers achieves such acceleration. The polymers in the Japanese publication are described as having a molecular weight above 1,000,000 preferably above 3,000,000. Table I in the publication describes a terpolymer prepared from sodium acrylate, acrylamide and methyl acrylate having a molecular weight of 7,000,000. This is the highest molecular weight terpolymer described in the reference. This is equivalent to an I.V. of about 3 to about 11 dl/g as measured in a one normal aqueous sodium nitrate solution.

However, the polymers as described in said Japanese publication generally have only marginal flocculation efficiency.

It has now been found that flocculation efficiency is increased when water soluble acrylamide containing polymers having an intrinsic viscosity of at least about 15 dl/g are used in water purification.

THE INVENTION

The water soluble acrylamide containing polymers of this invention have an intrinsic viscosity of at least about 15 dl/g and are of the following formula:

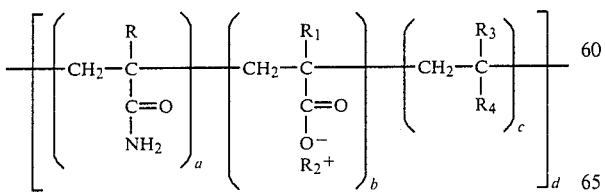

wherein R, $R_1$ and $R_3$ are independently hydrogen or methyl, $R_2^{30}$ is an alkali metal ion, such as $Na^+$ or $K^+$, $R_4$ is $OR_5$, where $R_5$ is an alkyl group having up to 5 carbon atoms,

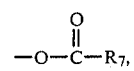

wherein $R_7$ is either methyl or ethyl,

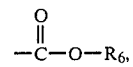

phenyl substituted phenyl, CN, or

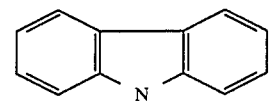

and $R_6$ is an alkyl group having up to 8 carbon atoms, wherein(a) is from about 5 to about 90, preferably from about 30 to about 60 percent, (b) is from 5 to about 90, preferably from about 30 to about 60 percent, (c) is from about 0.2 to about 20, preferably from about 1 to about 10 percent, and (d) is an integer of from about 100,000 to about 500,000, preferably from about 150,000 to about 400,000.

Under certain conditions, the alkoxy or acyloxy groups in the polymer may be partially hydrolyzed to the corresponding alcohol group and yield a tetrapolymer of the following general formula:

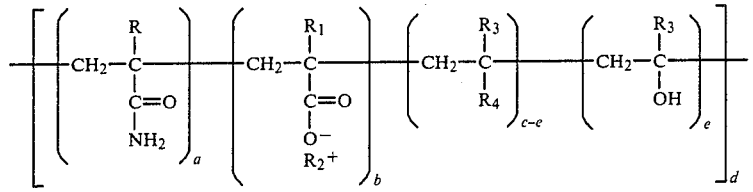

wherein R, $R_1$, $R_2^+$, $R_3$, $R_4$, a, b, c, and d are as previously defined and e is from about 0.1 to about 20 percent;

The preferred polymers are terpolymers of the following formula:

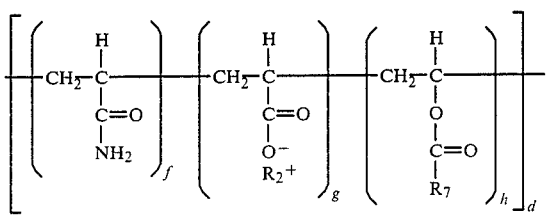

wherein $R_2^+$ is $Na^+$ or $K^+$, $R_7$ is methyl, ethyl, butyl, and f is from about 5 to about 90, preferably from about 30 to about 60 percent, g is from about 5 to 90, preferably from about 30 to 60 percent h is from about 0.2 to about 20 percent, and d is as previously defined.

The preferred tetrapolymers are of the following formula:

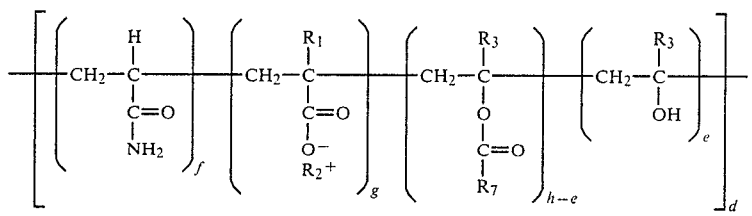

wherein $R_1$, $R_2^+$, $R_3$, $R_7$, f, g, h, d and e are as previous defined.

The polymers of this invention have an intrinsic viscosity of at least 15 dl/g, preferably from about 18 to about 35 dl/g as measured in a one normal aqueous sodium chloride solution at 25° C. This intrinsic viscosity corresponds to a molecular weight of from about 12,000,000 to about 42,000,000, preferably from about 15,000,000 to about 42,000,000 (T. J. Suen, et al, Journal of Polymer Science, 31, 481,1958).

The polymers are suitable for use as flocculants for water purification, such as to facilitate the settling of particles in phosphate slimes. A process for flocculating phosphate slimes is described in U.S. patent application Ser. No. 302,141 filed in the names of M. Rosen et al, titled "Process For Flocculating Phosphate Containing Slimes" and filed on the same date as this application.

The polymers of this invention are prepared by water-in-oil polymerization processes which are known in the art. Preferably, the polymers are produced by the process as described in U.S. patent application Ser. No. 302,108, now abandoned and refiled as U.S. patent application Ser. No. 537,513, filed Sept. 30, 1983, now U.S. Pat. No. 4,485,209, filed in the names of Y. Fan et al, titled "A Process For Producing A Polymer Water-In-Oil Emulsion" and filed on the same date as this application.

In said U.S. Pat. No. 4,485,209 a semi-continuous process for producing a polymer water-in-oil emulsion is described which process comprises:
  (a) combining: (i) an aqueous solution comprising at least one water-soluble monomer, and (ii) a mixture comprising a hydrophobic liquid, a hydrophobic monomer and an oil-soluble surfactant:
  (b) homogenzing the mixture from (a) to form a water-in-oil emulsion;
  (c) deoxygenating said homogenized water-in-oil emulsion;
  (d) continually adding the homogenized water-in-oil emulsion to a reactor while adding thereto a deoxygenated initiator solution;
  (e) heating the mixture from (d) under polymerization conditions so as to form a polymer water-in-oil emulsion; and
  (f) recovering a polymer water-in-oil emulsion.

The polymer is then recovered from the water-in-oil emulsion.

In the first step of the process, an aqueous solution containing a water-soluble monomer is combined with a mixture containing a hydrophobic liquid, at least one hydrophobic monomer and an oil-soluble surfactant. This combination of materials is homogenized to form a water-in-oil emulsion.

The aqueous solution contains a mixture of water soluble monomers. These monomers have a water solubility of at least 5 weight percent and include acrylamide, methacrylamide, acrylic acid, methacrylic acid, and their alkali metal salts, aminoalkyl acrylate, aminoalkyl methacrylate, dialkylaminoalkyl acrylate, dialkylamino methacrylate and their quarternized salts with dimethyl sulfate or methyl chloride, vinyl benzyl dimethyl ammonium chloride, alkali metal and ammonium salts of 2-sulfoethylacrylate, alkali metal and ammonium salts of vinyl benzyl sulfonates, maleic anhydride, 2-acrylamide-2-methylpropane sulfonic acid and the like. The preferred monomers are acrylamide and acrylic acid.

If acrylic acid is used as a monomer it is reacted with a base, preferably with an equivalent amount of base, such as sodium hydroxide, so that the sodium acrylate solution has a pH of from about 5.0 to about 10.0, preferably from about 6.5 to about 8.5, depending on the type and amount of base employed. This solution is combined with another water soluble monomer, such as acrylamide, and then with water to form the aqueous phase.

The aqueous phase comprises from about 65 to about 80, preferably from about 70 to about 78 weight percent of the total composition.

The mixture which is combined with the aqueous solution containing the water-soluble monomer(s) contains a hydrophobic liquid, a hydrophobic monomer and an oil-soluble surfactant.

The hydrophobic liquids suitable for use herein include benzene, xylene, toluene, mineral oils, kerosenes, petroleum, and mixtures thereof. A preferred hydrophobic liquid is Isopar M (sold by Humble Oil and Refinery Company).

The hydrophobic monomer(s) which may be used include one or more of vinyl esters, such as vinyl acetate, alkyl acrylates, such as ethylacrylate, alkyl methacrylates such as methyl methacrylate, vinyl ethers such as butylvinyl ether, acrylonitrile, styrene and its derivatives, such as α-methylstyrene, N-vinyl carbazole, and the like.

The surfactants suitable for use herein are usually of the oil-soluble type having a Hydrophile-Lipophile Balance (HLB) value of from about 1 to about 10, preferably from about 2 to about 6. These surfactants are normally referred to as the water-in-oil type. The surfactants include fatty acid esters, such as sorbitan monolaurate, sorbitan monstearate, sorbitan monooleate, sorbitan trioleate, mono and diglycerides, such as mono and diglycerides obtained from the glycerolysis of edible fats, polyoxyethylenated fatty acid esters, such as polyoxyethylenated (4) sorbitan monostearate, polyoxyethylenated linear alcohol, such as Tergitol 15-S-3 and Tergitol 25-L-3 (both supplied by Union Carbide Corp.), polyoxyethylene sorbitol esters, such as polyoxyethylene sorbitol beeswax derivative, polyoxyethylenated alcohols such as polyoxyethylenated (2) cetyl ether, and the like.

The mixture of the aqueous phase and oil phase contains from about 20 to about 50, preferably from about 22 to about 32 weight percent of the hydrophobic liquid and hydrophobic monomer(s), based on the total weight of the composition.

The aqueous solution (i) containing the water-soluble monomer(s) is combined with the mixture containing a hydrophobic liquid, a hydrophobic monomer(s) and an oil-soluble surfactant. This mixture is homogenized to form a water-in-oil emulsion. Homogenization takes place by subjecting the mixture to high shear mixing techniques which are generally well-known in the art. These include the use of homogenizers, high speed mixers and any other techniques for obtaining high shear mixing. The homogenization is carried out at a temperature of from about 10° to about 40° C., preferably from about 15° to 25° C. The homogenization may be carried out either continuously or in a batch process.

The emulsions so prepared have a rather narrow particle size distribution. The diameters of the majority of the particles range from about 0.2 to about 5 microns, preferably from about 1 to about 3 microns.

The water-in-oil emulsion so produced comprises:
(a) An aqueous phase comprising from about 45 to about 80, preferably from about 48 to about 78 weight percent and containing water soluble monomer(s) therein from about 20 to about 60, preferably from about 30 to about 50 weight percent;
(b) a hydrophobic liquid and hydrophobic monomer(s) comprising from about 15 to about 50, preferably from about 20 to about 40 weight percent;
(c) an oil-soluble surfactant comprising from about 0.5 to about 5, preferably from about 1 to about 3 weight percent, said weight percents.

After forming the water-in-oil emulsion, it is generally deoxygenated, by for example, subjecting the emulsion to a vacuum of from about 50 to about 500, preferably from about 100 to about 200 mm of mercury under an inert gas atmosphere at a temperature of from about 5° to about 30° C., either continuously or as a batch process.

A reactor is continuously charged with the deoxygenated water-in-oil emulsion. Preferably, an initial charge of between about 20 to about 50 percent of the deoxygenated emulsion is added to the reactor. Most preferably, the reactor is charged with an amount of deoxygenated water in-oil emulsion so as to cover the agitator blades therein. The amount charged to the reactor depends on the geometry and size of the reactor.

Also, a catalyst or initiator useful in polymerizing ethylenically unsaturated monomers is added to the reactor. These catalysts include one or more azo and/or peroxide containing compounds, such as t-butyl hydroperoxide, t-butyl perbenzoate, benzoyl peroxide, ammonium persulfate, cumene hydroperoxide, 2,2'-azobis-(isobutyronitrile), 2,2'-azobis(2,4-dimethylvaleronitrile), redox catalysts, and others known in the art. These catalysts are added to the reactor either directly or in the form of a solution, i.e., the catalyst is dissolved in a solvent, such as a hydrocarbon liquid, i.e., toluene. The catalyst solution contains from about 1 to about 10, preferably from about 3 to about 6 weight percent of the catalyst.

From about 1 to about 99, preferably from about 20 to about 60 percent of the catalyst solution is initially added to the reactor containing the water-in-oil emulsion.

The remaining water-in-oil emulsion and catalyst solution are then continually fed into the reactor.

The polymerization is carried out at a temperature of from about 30° to about 70° C., preferably from about 40° to about 55° C., most preferably from about 48° to about 52° C., for about 1 to about 10 hours, preferably from about 2 to about 6 hours. The reaction time depends on the size of the reactor and the polymerization conditions.

The polymerization is generally carried out at atmospheric pressure, although subatmospheric and superatmospheric pressures may be used. The polymerization is preferably carried out under an inert atmosphere, such as a helium, argon or nitrogen.

The polymerization reaction generates considerable heat which must be removed. Generally, the heat is dissipated by normal cooling facilities.

The polymerization reaction rate may be controlled by the introduction of small quantities of air (atmospheric air and/or oxygen) into the reaction. The air may be introduced, i.e., sparged, either intermittently or continuously into the reactor to control the reaction temperature. When a continuous air sparging is employed, the amount of oxygen in the reaction medium must be carefully controlled so as to achieve the desired rate of polymerization. An oxygen content of from about 0.01 to about 1.0, preferably from about 0.02 to about 0.50 parts per million is desirable. When the air is introduced intermittently, a flow rate of from about 0.01 to about 1.0, preferably from about 0.05 to about 0.5 cubic inches per minute, per pound of reactor charge is desirable. The duration of air injection may vary from a fraction of a second to a few seconds, and it may be repeated as many times as necessary until a desired rate of polymerization is achieved.

After the polymerization is complete, an antioxidant may be added to the reaction mass. Any organic antioxidant suitable for the inhibition of free radical reactions may be used. The antioxidant is generally dissolved in a suitable solvent. The preferred antioxidants include substituted phenols, such as Ionol, thiobisphenol, such as Santonox-R, benzothiazole, ammonium or sodium thiosulfate, thiocyanate of alkali metals, aminocarboxylic acid, sodium nitrite and hydroquinone derivatives, such as the monomethyl ether of hydroquinone. The suitable solvents include toluene, benzene, xylene, diethyl ether, methyl acetate, water and the like. The antioxidant is present in the solution in amounts of from about 1 to about 30, preferably from about 5 to about 10 percent.

The antioxidant solution is added to the reaction mass in amounts of from about 0.05 to about 5 parts per hundred parts of resin.

Addition of the antioxidant may be commenced either at the end of the polymerization or after the reaction mixture has been cooled to ambient temperature.

The reaction mass is generally cooled to about 25° C. and the polymer water-in-oil emulsion recovered.

The polymer water-in-oil emulsion is described in U.S. patent application Ser. No. 302,142, now abandoned and refiled as U.S. patent application Ser. No. 511,978, filed July 11, 1983, now abandoned and refiled as U.S. patent application Ser. No. 547,670, filed Nov. 1, 1983, now U.S. patent No. 4,452,940, filed in the names of N. Chu et al, titled "Polymer Water-In-Oil Emulsions", and filed on the same date as this application.

The polymer water-in-oil emulsion as described in said U.S. patent application Ser. No. 302,142, now abandoned and refiled as U.S. patent application Ser. No. 511,978, filed July 11, 1983, now abandoned and refiled as U.S. patent application Ser. No. 547,670, filed Nov. 1, 1983, now U.S. Pat. No. 4,452,940, comprises:
(a) an aqueous phase comprising from about 60 to about 80, preferably from about 68 to about 78 weight percent, and containing therein from about 30 to about 70, preferably from about 35 to about 50 weight percent of polymer and from about 30 to about 70, preferably from about 45 to about 65 weight percent of water;
(b) a hydrophobic liquid comprising from about 15 to about 39.5, preferably from about 19 to about 31 weight percent, and
(c) an oil-soluble surfactant comprising from about 0.5 to about 5, preferably from about 1 to about 3 weight percent.

The polymer may be recovered by, for example, coagulation in a large excess of a non-solvent for the polymer, such as isopropyl alcohol. The polymer is then collected by filtration and subsequently dried.

EXAMPLES

The following examples serve to give specific illustrations of the practice of this invention but they are not intended in any way to limit the scope of this invention.

EXAMPLE 1

Into a 500 ml, 4-necked, resin flask, fitted with a condenser, a thermometer, a mechanical stirrer, an addition funnel and a nitrogen inlet tube, were added 75 g of Isopar M and 4.4 g of Span 80 under nitrogen gas. In a separate beaker, 28.2 g of acrylic acid dissolved in 50 g of distilled water was neutralized (pH about 6.7) with 39.2 g of a 40 percent sodium hydroxide solution. The sodium acrylate solution was combined with an aqueous solution made with 47.1 g of acrylamide and 79 g of distilled water. The aqueous solution was purged with nitrogen and then added to the Isopar M-Span 80 mixture with rapid stirring to produce an emulsion. The emulsion was stirred under a nitrogen atmosphere for about ½ hour. 15.1 g of ethyl acrylate, 0.10 g of azobisisobutyronitrile, and 0.04 g of ammonium persulfate in 5 ml of distilled water was then added. The reaction mixture was heated to 40° C. and then 0.02 g of sodium bisulfite in 10 ml distilled water was added. The temperature of the emulsion was gradually increased to 43° C. At the same time, a solution made with 15 g of Isopar M and 4.4 g of Span 80 was slowly added to the reaction mixture. The polymerization was carried out at a temperature of 43°-45° C. for 4 hours and then at 55° C. for 1 hour. A smooth emulsion was obtained at the end of the reaction. A gas chromatographic study of the emulsion indicated that only four percent of the amount of ethyl acrylate used was left unreacted.

A portion of the polymer in the emulsion was precipitated by adding the emulsion to isopropanol. The polymer was isolated by filtering. The polymer had an intrinsic viscosity of 16.1 dl/g as measured in a one normal aqueous sodium chloride solution.

A clear aqueous solution was obtained when the isolated polymer was dissolved in water indicating that no homopolymer of ethyl acrylate was formed.

EXAMPLE 2

The procedure described in Example 1 was exactly repeated except that 0.2 g of azobisisobutyronitrile was used instead of the combination of azobisiosobutyronitrile and ammonium persulfate.

The polymer produced had an intrinsic viscosity of 16.7 dl/g as measured in a one normal aqueous sodium chloride solution.

EXAMPLES 3 AND 4

The procedure described in Example 2 was used to prepare the polymer emulsions of Examples 3 and 4. The emulsions obtained were used as flocculants in phosphate slimes.

Aqueous solutions of the polymer emulsions containing 0.3 g of the polymer were made by dissolving the desired amount of the water-in-oil polymer emulsion in distilled water containing about 0.14 g of a polyoxyethylenated nonylphenol surfactant (Tergitol NP-13) and diluted to 100 g. The solutions were used as flocculants in phosphate slimes. The performance of the polymer emulsion as a flocculant in a phosphate slime (a phosphate slime obtained from a phosphate mining company) was measured by the time in seconds for the falling interface to travel 30 percent of the height of the sedimentation tube (designated $t_{70}$). The results are shown in Table I. Control A contains no polymer.

TABLE I

| | Mole Ratio | | | |
|---|---|---|---|---|
| Example | Sodium Acrylate | Acrylamide | Ethyl Acrylate | Performance, $t_{70}$ (sec) |
| 3 | 32.5 | 55.0 | 12.5 | 8.4 |
| 4 | 25.0 | 62.5 | 12.5 | 9.7 |
| Control A | — | — | — | >several hours |

EXAMPLE 5

The procedure described in Example 2 was exactly repeated except that vinyl acetate was used instead of ethyl acrylate. 13.0 g of acrylic acid, 64.3 g of acrylamide and 11.3 g of vinyl acetate were used. The acrylic acid was first neutralized with 18.1 g of a 40 percent sodium hydroxide solution.

EXAMPLE 6

The procedure described in Example 2 was exactly repeated except that 6.4 g of acrylonitrile was used instead of ethyl acrylate. Also 13.0 g of acrylic acid, and 64.3 g of acrylamide, was used. The acrylic acid was neutralized with 18.1 g of a 40 percent sodium hydroxide solution.

EXAMPLE 7

The procedure described in Example 5 was exactly repeated except that 7.7 g of butyl acrylate was used instead of vinyl acetate.

EXAMPLE 8

The procedure described in Example 2 was exactly repeated except that 34.8 g of acrylic acid, 47.2 g of acrylamide and 6.0 g of ethyl acrylate were used. The acrylic acid used was only 50 percent neutralized (pH=4.9) with 24.1 g of a 40 percent sodium hydroxide solution. Preparations described in Examples 5 through 7 were evaluated as flocculants in phosphate slimes and shown to be effective.

EXAMPLE 9

Preparation of monomer emulsion feed:
(i) Sodium acrylate solution: An acrylic acid solution containing 158.2 gm of acrylic acid and 186.94 gm of deionized water was neutralized with a freshly prepared 40 percent sodium hydroxide solution (about 229.09 gm) to a final pH of 6.5. The neturalization was carried out at a temperature not exceeding 20° C. to prevent premature polymerization from taking place.

(ii) Acrylamide solution: The solution was prepared by adding 205.69 gm of acrylamide crystals under vigorous stirring to 251.95 gm of deionized water at a temperature below 25° C. Air was present during the dissolution to inhibit polymerization.

(iii) Oil-soluble monomer and surfactant mixture: A homogeneous solution was prepared by dissolving 18.92 gm of a sorbitan monooleate (Span-80 supplied by Imperial Chemical Industries) into 339.5 gm of Isopar-M while stirring. Thereafter, 21.27 gm of vinyl acetate was rapidly added and the system stirred for an additional five minutes to yield a uniform mixture.

(iv) Monomer emulsion feed: Into a Waring blendor, containing mixture (iii), was added, under vigorous stirring, solutions (i) and (ii). The latter was combined with 0.06 gm of ethylenediamine tetraacetic acid prior to its addition to ensure compositional uniformity of the finished monomer emulsion.

The monomer emulsion as prepared above was thoroughly deoxygenated by stirring under a vacuum for 10 minutes and subsequently breaking the vacuum with nitrogen; this procedure was repeated two more times. Thereafter, the monomer emulsion was kept at 25° C. or below under a nitrogen atmosphere until its complete addition. The storage tank was equipped with a cooling coil (jacket), a temperature measuring device, and an air-injection dip tube which can be used to stop the polymerization in case of an accidental initiation.

Initiator solution feed: This solution was prepared by dissolving 0.78 gm of 2,2'-azobis(isobutyronitrile) dissolved in 17.78 gm of toluene. The solution was purged with nitrogen before and during the course of polymerization.

Inhibitor solution: The solution was prepared by dissolving 0.78 gm of a thiobisphenol (Santonox-R supplied by Monsanto Chemical Co.) in 10 gm of toluene.

The reactor consisted of a two-liter Pyrex glass reactor equipped with a turbine agitator, two addition funnels, a condenser, a thermometer, and a nitrogen inlet and outlet tube. An external heating/cooling bath was employed. The turbine agitator had a four-one-inch blade impeller and the blades were pitched at a 45° angle to the driving shaft.

The reactor was charged, under a nitrogen atmosphere, with 282.32 gm (20 percent) of the monomer emulsion. While the nitrogen flow continued, heating was applied to bring the reaction temperature to 55° C. Once the temperature was stabilized, 3.91 gm of the initiator solution was quickly added. Thereafter, both the monomer emulsion and the catalyst solution streams were continuously fed into the reactor at rates such that feeding was complete in about two hours. The induction time was usually very short and an exotherm may occur immediately after the initiator addition. After charging was complete, the polymerization was allowed to continue for two additional hours. During this period, sufficient cooling was provided to dissipate the heat of polymerization. The reactor temperature was maintained at 55±2° C. At the end of polymerization, the inhibitor solution was added and the reactor was allowed to cool to room temperature (about 25° C.). The product was discharged through a two-layer cheese cloth. The conversion was usually quantitative and the finished emulsion contained about 30 percent by weight of polymer. The polymer had an intrinsic viscosity of 18.4 dl/gm. as measured in a one normal aqueous sodium chloride solution. The emulsion was highly uniform and contained very fine particles which had diameters raging from 0.2 to 2 microns.

EXAMPLE 10

Preparation of monomer emulsion feed (i) Sodium acrylate solution: An acrylic acid solution containing 124.84 gm acrylic acid and 227.86 gm of deionized water was neutralized with a freshly prepared 40 percent sodium hydroxide solution (about 173.39 gm) to a final pH of 6.5. The neutralization was carried out at temperatures not exceeding 20° C. to prevent premature polymerization from taking place.

(ii) Acrylamide solution: This solution was prepared by adding 205.93 gm of acrylamide crystals to 261.6 gm of water under vigorous stirring at temperatures below 25° C. Air was present during the dissolution to inhibit polymerization.

(iii) Oil-soluble monomer and surfactant mixture: A homogeneous solution was prepared by dissolving 19.12 gm of Span-80 into 339.43 gm of Isopar-M under agitation. Thereafter, 66.6 gm of ethyl acrylate was rapidly added and the system stirred for an additional five minutes to yeild a uniform mixture.

The monomer emulsion feed was prepared and deoxygenated, the initiator solution feed and inhibitor solution were prepared and the monomers polymerized by the procedure described in Example 9.

The product was a milky white water-in-oil emulsion. Examination by an optical microscope showed that the average diameter of the suspended particles was about 1 to 2 microns. The polymer had an intrinsic viscosity of 16.4 dl/gm as measured in a one normal aqueous sodium chloride solution.

EXAMPLE 11

Example 9 was exactly repeated except that the following changes were made: (1) 2,2'-azobis(isobutyronitrile) was replaced with one-half the amount of (2,2'-azobis 2,4-dimethylvaleronitrile) and the polymerization was carried out at 52° C.; (2) the pH of the sodium acrylate solution was adjusted to 8.6 instead of 6.5. The resultant terpolymer had an intrinsic viscosity of 29.7 gl/g as measured in a one normal aqueous sodium chloride solution. A 0.3 percent aqueous solution prepared according to the procedure described in Examples 3 and 4 had a Brookfield viscosity of 2,720 centipoise.

EXAMPLE 12

Example 11 was exactly repeated except that the following changes were made: (1) the pH of the sodium acrylate solution was adjusted to 9.4 instead of 8.6; (2) a commercial rayon-cell 50 percent caustic solution was used to neutralize the acrylic acid. The resultant terpolymer had an intrinsic viscosity of 21 dl/g as measured in a one normal aqueous sodium chloride solution. A 0.3 percent aqueous solution prepared according to the procedure described in Example 3 and 4 had a Brookfield viscosity of 2,650 centipoise.

EXAMPLE 13

Example 11 was exactly repeated with the exception that: (1) A 50 percent aqueous acrylamide solution (Cyanamide-50 supplied by American Cyanamid Co.) was substituted for the acrylamide crystals; an equal amount of water was reduced from the original formulation such that the oil/water phase ratio remained unchanged; (2) acrylic acid was neutralized to a pH of 6.5 instead of 8.6. The resultant terpolymer had an intrinsic viscosity of 21.7 dl/g as measured in a one normal aqueous sodium chloride solution. A 0.3 percent aqueous solution prepared according to the procedure described in Examples 3 and 4 had a Brookfield viscosity of 2,848 centipoise.

EXAMPLE 14

Example 9 was repeated with the exception that (1) Vazo-64 was replaced with one-half the amount of Vazo-52; (2) the polymerization was carried out at 52° C. according to the following procedures:

Polymerization reactor: A two-liter Pyrex glass reactor equipped with a turbine agitator, an addition funnel, a condenser, a thermometer, a nitrogen inlet and outlet, and an external heating/cooling bath was employed. The turbine agitator had a four-one-inch-blade impeller and the blades were pitched at a 45° C. angle to the driving shaft, and was operating at 650 revolutions per minute during the course of polymerization.

The monomer emulsion was transferred into the glass reactor and was degassed by stirring it under vacuum for 10 minutes and subsequently breaking the vacuum with nitrogen; this procedure was repeated two more times.

About 20 percent of the Vazo-52/toluene solution, was introduced into the degassed monomer emulsion in the reactor. While the nitrogen flow continued, external heating was applied to bring the reaction temperature to 52° C. Once the polymerization began, the remaining initiator solution was added continuously into the reactor at a rate such the at the addition was completed in two hours. When the initiator solution addition was finished, the polymerization was allowed to proceed for two additional hours. During the entire course of polymerization, sufficient cooling was provided in order to dissipate the heat of polymerization. At the end of the polymerization, the emulsion was cooled to room temperature (about 25° C.), and the inhibitor solution was added. The water-in-oil emulsion produced was a fairly viscous, milky white liquid. The conversion was quantitative. The polymer produced had an intrinsic viscosity of 32 gl/g as measured in a one normal aqueous sodium chloride solution.

EXAMPLE 15

The procedure of Example 9 was used to prepare an emulsion containing an acrylamide/sodium acrylate/vinyl acetate terpolymer at a temperature of 55° C. The terpolymer contained 54.2 mole percent of acrylamide, 41.1 mole percent sodium acrylate and 4.7 mole percent of vinyl acetate. The terpolymer had an intrinsic viscosity of 13 dl/g as measured in a one normal aqueous sodium chloride solution.

An Aqueous solution of the polymer emulsion containing 0.3 g of the polymer was made by dissolving the desired amount of the water-in-oil polymer emulsion in distilled water containing about 0.14 g of a polyoxyethylenated nonylphenol surfactant (Tergitol NP-13) and diluted to 100 g. The solution was used as a flocculant in phosphate slimes. The performance of the polymer emulsion as a flocculant in a phosphate slime (a phosphate slime obtained from a phosphate mining company) was measured by the time in seconds for the falling interface to travel 30 percent of the height of the sedimentation tube (designated $t_{70}$). The results are shown in Table II.

EXAMPLE 16

The procedure of Example 15 was repeated to prepare a terpolymer having an intrinsic viscosity of 15 dl/g as measured in a one normal aqueous sodium chloride solution. An aqueous solution of the polymer emulsion was prepared and tested as described in Example 15.

The results are shown in Table II.

EXAMPLE 17

The procedure of Example 15 was repeated to prepare a terpolymer having an intrinsic viscosity of 17 dl/g as measured in a one normal aqueous sodium chloride solution. An aqueous solution of the polymer emulsion was prepared and tested as described in Example 15.

The results are shown in Table II.

EXAMPLE 18

The procedure of Example 15 was repeated to prepare a terpolymer having an intrinsic viscosity of 19 dl/g as measured in a one normal aqueous sodium chloride solution. An aqueous solution of the polymer emulsion was prepared and tested as described in Example 15.

The results are shown in Table II.

EXAMPLE 19

The procedure of Example 15 was repeated to prepare a terpolymer having an intrinsic viscosity of 22 dl/g as measured in a one normal aqueous sodium chloride solution. An aqueous solution of the polymer emulsion was prepared and tested as described in Example 15.

The results are shown in Table II.

EXAMPLE 20

The procedure of Example 15 was repeated to prepare a Series of terpolymers having an intrinsic viscosity range of between 13 and 28 dl/g as measured in a one normal aqueous sodium chloride solution. An aqueous solution of the polymer emulsion was prepared and tested as described in Example 15.

The results are shown in Table II.

TABLE II

| Example | I.V. of Polymer (dl/g) | Performance, $t_{70}$ (sec) |
| --- | --- | --- |
| 15 | 13 | 41 |
| 16 | 15 | 30.5 |
| 17 | 17 | 20 |
| 18 | 19 | 13 |
| 19 | 22 | 11.5 |
| 20 | 28 | 11.5 |

What is claimed is:

1. A water soluble acrylamide containing polymer having an intrinsic viscosity of from about 15 to about 28 dl/g as measured in a one normal aqueous sodium chloride solution at 25° C. and having the following formula:

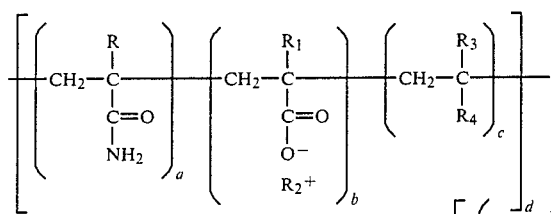

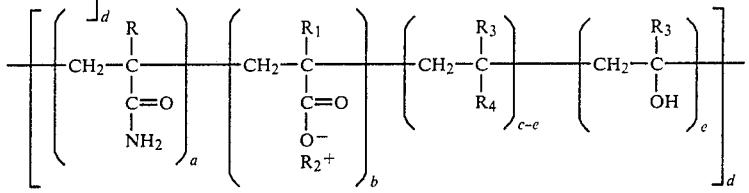

wherein:
R, $R_1$ and $R_3$ are independently hydrogen or methyl;
$R_2^+$ is an alkali metal ion;
$R_4$ is (1) $OR_5$ wherein $R_5$ is an alkyl group having up to 5 carbon atoms, (2)

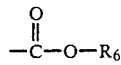

wherein
$R_6$ is an alkyl group having up to 8 carbon atoms, (3)

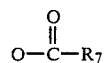

wherein $R_7$ is methyl, ethyl or butyl, (4) phenyl, (5) substituted phenyl or (6)

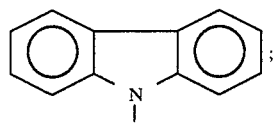

a is from 5 to 90 percent;
b is from 5 to about 90 percent;
c is from about 0.2 to about 20 percent; and
d is an integer of from about 100,000 to about 500,000.

2. A water soluble polymer as defined in claim 1, wherein the polymer has the following formula:

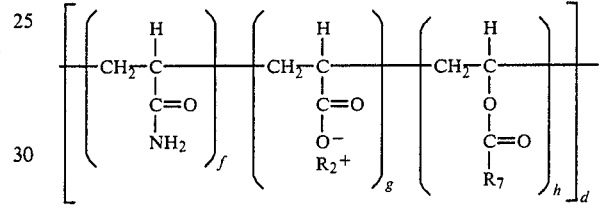

wherein R, $R_1$, $R_2^+$, $R_3$, $R_4$, a, b, c, and d are as previously defined and e is from about 0.1 to about 20 percent.

3. A water soluble polymer as defined in claim 1, wherein the polymer has the following formula:

wherein $R_2^+$ is $Na^+$ or $K^+$, $R_7$ is methyl, ethyl, butyl, and f is from about 5 to about 90, preferably from about 30 to about 60 percent, g is from about 5 to 90, preferably from about 30 to 60 percent and h is from about 0.2 to about 20 percent.

4. A water-soluble polymer as defined in claim 1 wherein R is hydrogen.

5. A water-soluble polymer as defined in claim 1 wherein $R_1$ is hydrogen and $R_2^+$ is $Na^+$.

6. A water-soluble polymer as defined in claim 1 wherein the monomeric unit defined in (c), is derived from a vinyl ester, alkyl acrylate, alkyl methacrylate, vinyl ether or styrene.

7. A water-soluble polymer as defined in claim 6 wherein the monomeric unit is derived from an alkyl acrylate or a vinyl acetate.

* * * * *

UNITED STATES PATENT AND TRADEMARK OFFICE
CERTIFICATE OF CORRECTION

PATENT NO. : 4,529,782

DATED : July 16, 1985

INVENTOR(S) : You-Ling Fan et al.

It is certified that error appears in the above-identified patent and that said Letters Patent is hereby corrected as shown below:

At column 1, line 68 "$R_2^{30}$" should read -- $R_2^+$ --.

After Claim 7 beginning at column 14, line 50 insert:

-- 8. A water-soluble polymer as defined in Claim 1 wherein the polymer has the following formula:

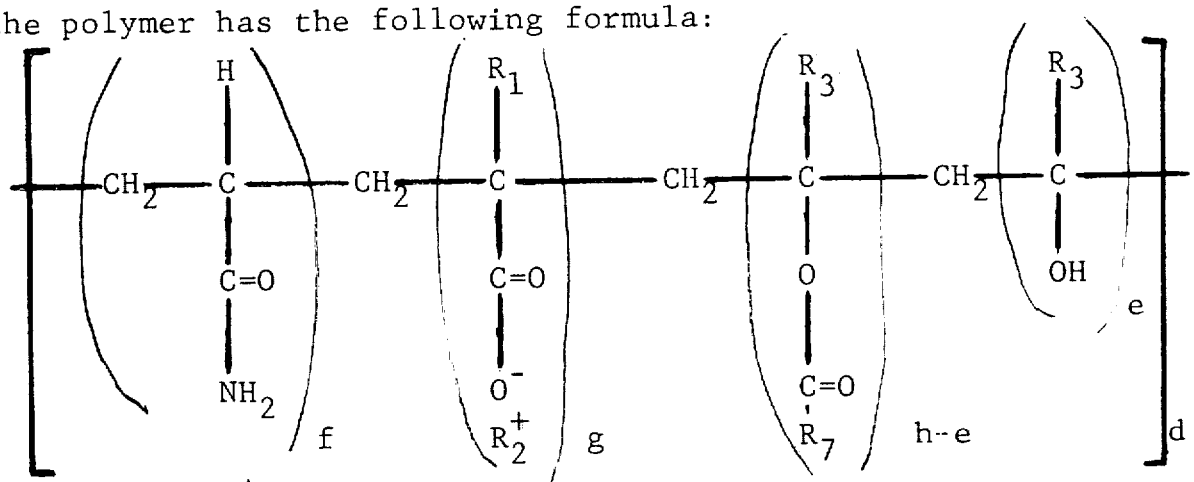

wherein $R_1$, $R_2^+$, $R_3$, $R_7$, d and e are as previously defined; f is from about 30 to about 60 percent; g is from about 30 to 60 percent; and h is from about 0.2 to about 20 percent.

9. A water-soluble polymer as defined in Claim 1

UNITED STATES PATENT AND TRADEMARK OFFICE
CERTIFICATE OF CORRECTION

PATENT NO. : 4,529,782
DATED : July 16, 1985
INVENTOR(S) : You-Ling Fan et al.

It is certified that error appears in the above-identified patent and that said Letters Patent is hereby corrected as shown below:

having an intrinsic viscosity of from about 17 to about 22 dl/g as measured in a one normal aqueous sodium chloride solution at 25°C.

On the title page "7 Claims" should read -- 9 Claims --.

Signed and Sealed this

Seventh Day of January 1986

[SEAL]

Attest:

DONALD J. QUIGG

Attesting Officer

Commissioner of Patents and Trademarks